United States Patent
Hashimoto et al.

(10) Patent No.: US 8,553,119 B2
(45) Date of Patent: Oct. 8, 2013

(54) AMPLIFYING IMAGE SIGNAL WITH CHANGING GAINS

(71) Applicant: Canon Kabushiki Kaisha, Tokyo (JP)

(72) Inventors: Seiji Hashimoto, Yokohama (JP); Keisuke Ota, Tokyo (JP); Kazuyuki Shigeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/647,650

(22) Filed: Oct. 9, 2012

(65) Prior Publication Data

US 2013/0033630 A1 Feb. 7, 2013

Related U.S. Application Data

(62) Division of application No. 12/491,619, filed on Jun. 25, 2009, now Pat. No. 8,310,576.

(30) Foreign Application Priority Data

Jun. 30, 2008 (JP) ................................. 2008-171747

(51) Int. Cl.
*H04N 3/14* (2006.01)
*H04N 5/335* (2011.01)
*H01L 31/00* (2006.01)

(52) U.S. Cl.
USPC .................... 348/300; 348/301; 250/214.1

(58) Field of Classification Search
USPC ................................ 348/300, 301; 250/214.1
See application file for complete search history.

(56) References Cited

U.S. PATENT DOCUMENTS

| | | | |
|---|---|---|---|
| 4,731,665 A | 3/1988 | Hashimoto et al. | |
| 4,959,723 A | 9/1990 | Hashimoto | |
| 4,962,412 A | 10/1990 | Shinohara et al. | |
| 5,146,339 A | 9/1992 | Shinohara et al. | |
| 5,283,428 A | 2/1994 | Morishita et al. | |
| 5,396,288 A | 3/1995 | Tsugita et al. | |
| 6,137,533 A | 10/2000 | Azim | |
| 7,830,436 B2 | 11/2010 | Sumi et al. | |
| 2003/0197795 A1 | 10/2003 | Schinner | |
| 2004/0017495 A1 | 1/2004 | Funakoshi et al. | |
| 2004/0080637 A1 | 4/2004 | Nakamura et al. | |
| 2005/0168602 A1 | 8/2005 | Sumi et al. | |
| 2005/0270393 A1 | 12/2005 | Noda et al. | |
| 2008/0291304 A1 | 11/2008 | Ota et al. | |
| 2009/0021621 A1 | 1/2009 | Hashimoto et al. | |
| 2009/0160947 A1 | 6/2009 | Shigeta et al. | |

(Continued)

FOREIGN PATENT DOCUMENTS

| | | |
|---|---|---|
| JP | 6-097414 A | 4/1994 |
| JP | 7-210705 A | 8/1995 |
| JP | 2003-189126 A | 7/2003 |
| JP | 2004-015701 A | 1/2004 |

(Continued)

*Primary Examiner* — Kelly L Jerabek
(74) *Attorney, Agent, or Firm* — Fitzpatrick, Cella, Harper & Scinto

(57) ABSTRACT

An object of the present invention is to provide an imaging system capable of improving S/N ratio and increasing dynamic range and a method of driving the imaging system suited to the improvement and increase. An imaging system includes: a solid-state imaging device having a plurality of pixels arranged in a matrix, column amplifiers each corresponding to each of columns of the pixels and an output portion for outputting an image signal based on an amplification by the column amplifier; and a signal processing portion receiving the image signal, wherein the column amplifier amplifies a signal output from the pixel by a gain q larger than 1, and the signal processing portion multiplies, by a factor less than 1, the image signal based on the signal amplified by the gain q.

21 Claims, 13 Drawing Sheets

(56) References Cited

U.S. PATENT DOCUMENTS

| | | |
|---|---|---|
| 2010/0157083 A1 | 6/2010 | Ohya et al. |
| 2010/0321532 A1 | 12/2010 | Hashimoto et al. |
| 2011/0025420 A1 | 2/2011 | Sumi et al. |
| 2012/0104235 A1 | 5/2012 | Sumi et al. |

FOREIGN PATENT DOCUMENTS

| | | |
|---|---|---|
| JP | 2004-112742 A | 4/2004 |
| JP | 2005-175517 A | 6/2005 |
| JP | 2006-033816 A | 2/2006 |
| JP | 2007-189537 A | 7/2007 |
| JP | 2008-060708 A | 3/2008 |
| WO | 2006/017042 A2 | 2/2006 |

AMPLIFYING IMAGE SIGNAL WITH CHANGING GAINS

BACKGROUND OF THE INVENTION

1. Field of the Invention

The present invention relates to an imaging system and a method of driving the same and, in particular, to increase in dynamic range and improvement in S/N ratio.

2. Description of the Related Art

As to solid-state imaging devices improvement in S/N ratio and increase in dynamic range is required. Japanese Patent Application Laid-Open No. 2004-015701 describes that, for meeting such a requirement, a detection circuit for detecting the level of an image signal and an amplifier circuit are provided for each column of pixel arranged in a matrix to control the gain of the image signal on a pixel basis. This allows increase in dynamic range with the S/N ratio maintained.

Japanese Patent Application Laid-Open No. H06-070222 describes an amplifier circuit for amplifying an output signal from an imaging device. For a signal in a relatively bright area, there is performed synthesis using data in which an output signal from the imaging device is analog-to-digital converted. For a signal in a relatively dark area, there is performed inlay synthesis using data in which a signal amplified with a higher amplification ratio is analog-to-digital converted. This, according to the application, allows the effective use of dynamic range of the imaging device.

In the technique disclosed in Japanese Patent Application Laid-Open No. 2004-015701, however, the detection circuit for detecting a pixel signal from a pixel is provided for each column of pixel, increasing an area occupied by the solid-state imaging device. Furthermore, detection is performed for each pixel which leads to an increase in power consumption.

In the technique disclosed in Japanese Patent Application Laid-Open No. H06-070222, on the other hand, the S/N ratio of a signal output from the imaging device is not changed. The dynamic range of the imaging device itself is not increased either.

SUMMARY OF THE INVENTION

The present invention has been made in view of the above problems, and it is an object of the present invention to provide an imaging system capable of improving S/N ratio and increasing dynamic range and a method of driving the imaging system suited to the object.

An imaging system as a first aspect of the present invention includes: a solid-state imaging device having a plurality of pixels arranged in a matrix, column amplifiers each provided corresponding to each of columns of the pixels and an output portion for outputting an image signal based on an amplification by the column amplifier; and a signal processing unit receiving the image signal, wherein the column amplifier amplifies a signal output from the pixel by a gain q greater than 1, and the signal processing unit amplifies, by a factor smaller than 1, the image signal based on the signal amplified by the gain q.

A method of driving an imaging system as another aspect of the present invention, the imaging system including: a solid-state imaging device having a plurality of pixels arranged in an array, a column amplifiers each corresponding to each of columns of the pixels and an output unit for outputting an image signal based on an amplification by the column amplifier; and a signal processing unit receiving the image signal, wherein the method comprising steps of: amplifying, by the column amplifier, a signal output from the pixel by a gain q greater than 1, and amplifying, by the signal processing unit, by a factor smaller than 1, the image signal based on the signal amplified by the gain q.

According to the present invention, it is enabled to improve the S/N ratio of the signal output from the solid-state imaging device and increase the dynamic range of the solid-state imaging device.

Further features of the present invention will become apparent from the following description of exemplary embodiments with reference to the attached drawings.

DESCRIPTION OF THE EMBODIMENTS

The principle of the present invention is described below.

Figure 1:
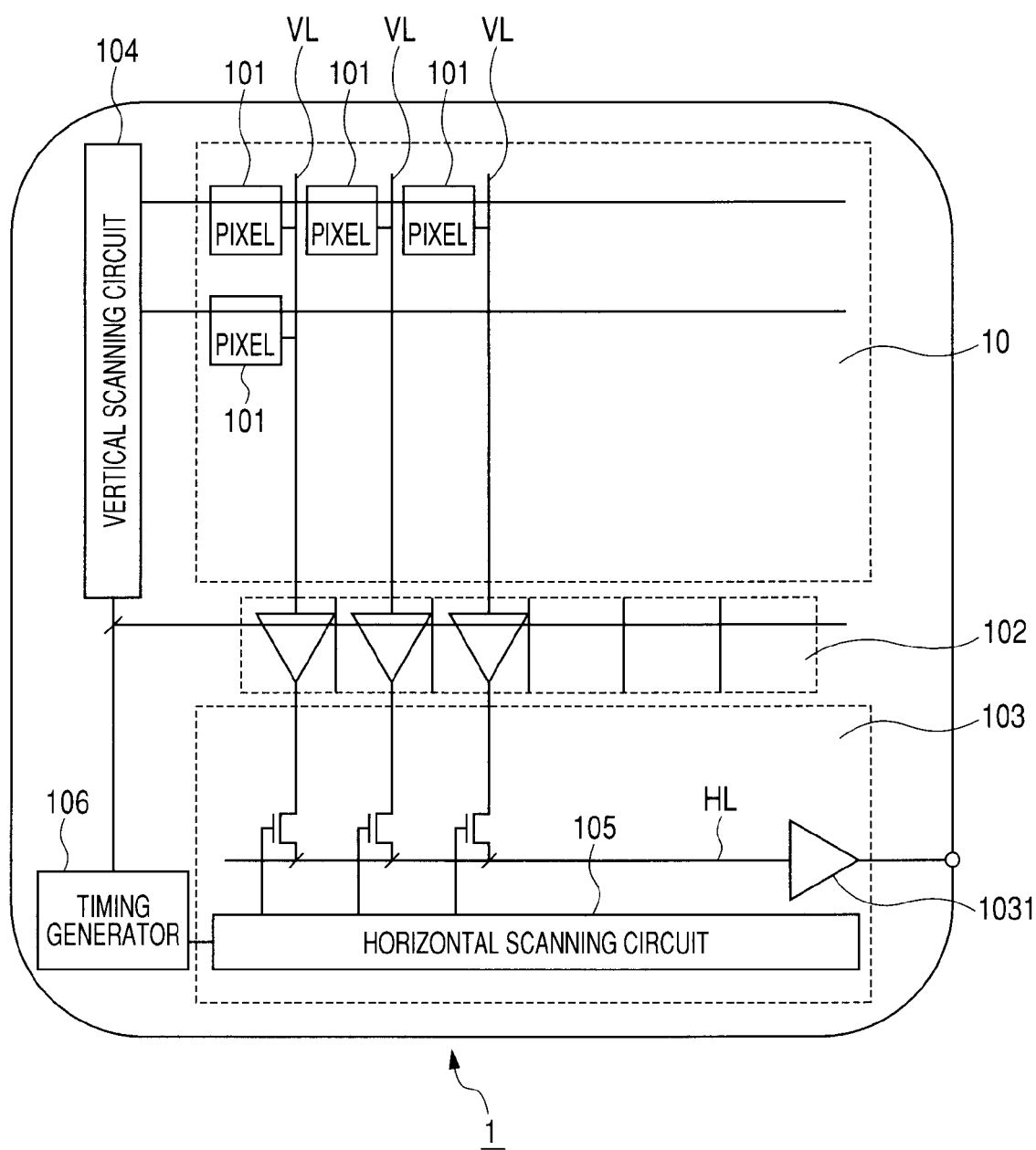
FIG. 1 is a schematic diagram of an imaging device according to an embodiment.

FIG. 1 is a schematic diagram of a solid-state imaging device. A solid-state imaging device 1 includes a pixel portion 10 in which pixels 101 are arranged in a matrix, a column amplifier 102 and an output portion 103. The pixel portion 10 includes a photoelectric conversion element and may further include a pixel output unit for converting the charge generated in the photoelectric conversion element into a voltage signal for output and a pixel selecting unit for selecting the pixels 101. For the sake of simplicity of the figure, only four pixels 101 are illustrated therein. However, the following description will be made supposing that there are m-row and n-column pixels 101 in the solid-state imaging device 1. The column amplifier 102 includes the column amplifier 102 provided corresponding to each column of the pixels 101. Each column amplifier 102 is adjustable in gain. The output portion 103 includes an output amplifier 1031, for example, and outputs a signal to the outside of the solid-state imaging device 1 through the output amplifier 1031. The pixels 101 provided on the same column are connected to the column amplifier 102 through the same vertical signal line VL. When the pixel 101 is selected by a vertical scanning circuit, the pixel 101 outputs a signal to the vertical signal line VL and the signal is amplified by the column amplifier 102. When a switch connecting the output node of the column amplifier 102 to a horizontal signal line HL is turned on, the column amplifier 102 outputs the signal to the outside of the solid-state imaging device 1 through the output amplifier 1031. A timing generator 106 is configured to supply a signal to the vertical scanning circuit 104 and the horizontal scanning circuit 105 and may supply a signal for controlling the gain of the column amplifier 102. The timing generator 106 may be provided on the outside of the solid-state imaging device 1.

Figure 2A:
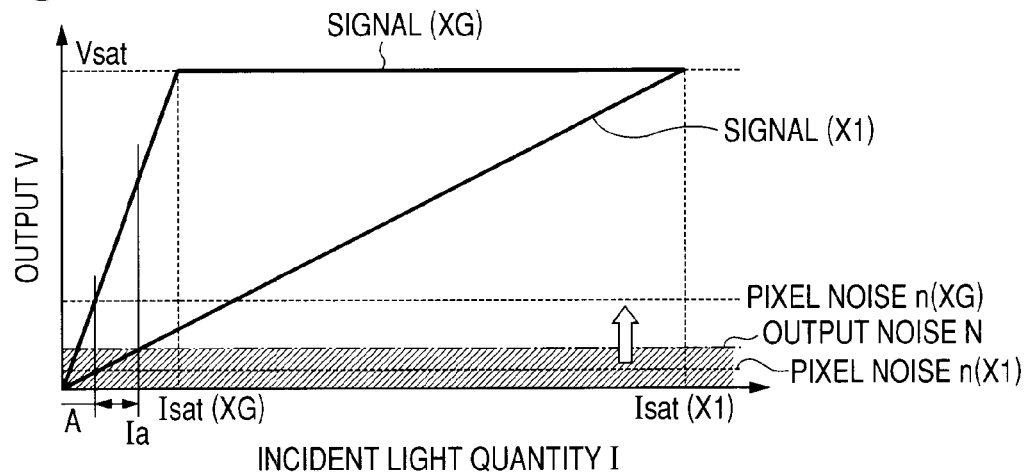
FIGS. 2A, 2B and 2C are charts describing the principle of the present invention.

FIG. 2A illustrates, with reference to the solid-state imaging device 1 illustrated in FIG. 1, relationship of a signal component output from the solid-state imaging device 1 to the quantity of light incident on the pixel 101, with the gain of the column amplifier 102 being 1. The relationship is indicated by "Signal×1" in the figure with an incident light quantity as the abscissa and the magnitude of output of the solid-state imaging device 1 as the ordinate. The incident light quantity exceeding Isat (×1) saturates output to reach Vsat. The following discussion on the saturation level Vsat can be applied to both the column amplifier 102 and the output portion 103. In the figure, a broken line indicates a pixel noise n generated in the pixel 101 and an alternate long and short dash line indicates an output noise N generated in the output portion 103. The pixel noise n is, for example, a noise generated in a pixel output unit and a pixel selecting unit included in the pixel. More specifically, in the case where the pixel output unit configures a source follower circuit together with a constant current source provided on the vertical signal line VL, temporal fluctuation in value of current flowing through the constant current source may result in the pixel noise n. The output noise N includes a noise generated by driving the output amplifier 1031, for example. The pixel noise n and the output noise N are not always constant in level, but vary with time. FIG. 2A illustrates the maximum level in the case where respective noises vary with time.

When the column amplifier 102 has a gain of 1 as illustrated in FIG. 2A, the output noise N is generally greater than the pixel noise n (×1), which makes the output noise N dominant. A signal output from the pixel 101 which has received incident light quantity at which the signal (×1) is smaller the output noise N cannot be properly captured from the solid-state imaging device 1 because of the influence of the output noise N. Suppose that the level of output which is output from the solid-state imaging device 1 is v0, for example. At the timing when the output v0 is output, noise level is small and the level may properly correspond to the incident light quantity, or the output may be v0 due to the influence of noise despite that the output smaller in level than v0 could have been obtained. The reason the output noise N is greater than the pixel noise n is that a portion before the output portion is driven at a comparatively low speed and narrow in band because pixels are scanned generally on a line by line basis, on the other hand, the output portion is driven at a high speed and wide in band.

In FIG. 2A, the signal output by the same pixel that outputs the signal (×1) is amplified by a gain G with the column amplifier 102 (where, G>1). The relationship between the incident light quantity and the output from the solid-state imaging device 1 is represented by the signal (×G) in FIG. 2A. The signal (×G) reaches the saturation output Vsat with the incident light quantity Isat (×G) smaller than that for the signal (×1). In other words, the greater the gain of the column amplifier 102, the steeper the gradient of the straight line indicating the output of the solid-state imaging device 1 to the incident light quantity. Furthermore, by changing the gain of the column amplifier 102, both a signal component and the pixel noise n are amplified by a gain G. However, the output noise N does not depend on the gain of the column amplifier 102. For this reason, increasing the gain of the column amplifier 102 causes the amplified pixel noise n to exceed the output noise N. That is to say, setting the gain of the column amplifier 102 to G makes the amplified pixel noise n dominant, which makes the output noise N relatively small. Accordingly, the signal corresponding to an incident light quantity which could not be properly captured when the gain of the column amplifier 102 is 1 because the output noise N is dominant can be captured. The range of the incident light quantity at which a signal can be captured by setting the gain of the column amplifier 102 to G is indicated by A in the figure. In other words, the dynamic range of the solid-state imaging device 1 is increased by the range A of the incident light quantity.

Figure 2B:
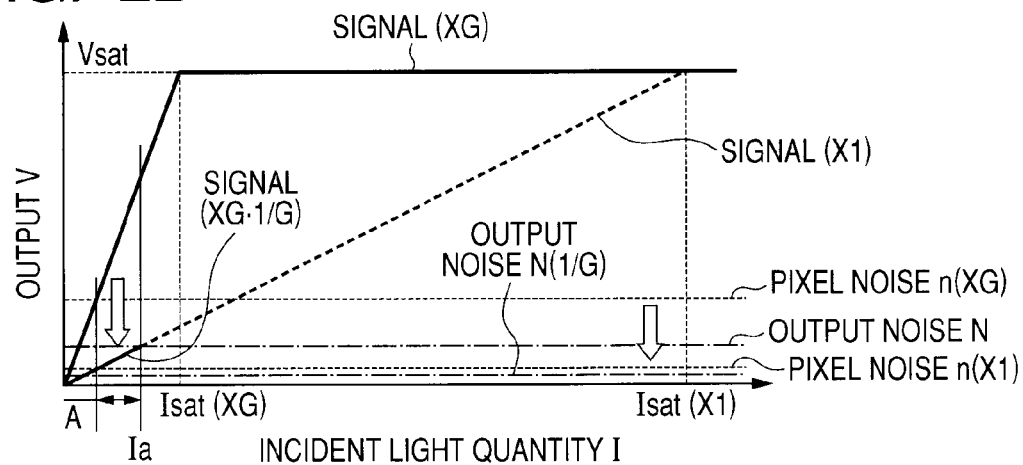

The signal (×G) may be used within the range of the incident light quantity from 0 to Ia and the signal (×1) may be used within the range of the incident light quantity above Ia, however, the signal level significantly changes at the incident light quantity of Ia. For this reason, the signal (×G) output from the solid-state imaging device 1 is multiplied by 1/G with an external processing circuit being a signal processing unit. FIG. 2B illustrates the above description. The signal (×G) turns into the signal (×G·1/G) to coincide with the characteristic of the signal (×1). Similarly, the pixel noise n (×G) is multiplied by 1/G to coincide with the pixel noise n (×1). On the other hand, the multiplication of the gain of the column amplifier by G does not change the output noise N, so the multiplication of the output noise N by 1/G with a processing circuit provided outside the solid-state imaging device 1 allows the output noise N to become the output noise N (1/G). In other words, the multiplication of the output noise N by 1/G with an external processing circuit reduces noise components due to the output noise N in the range of the incident light quantity from 0 to Isat, causing the S/N ratio to the output noise N of the signal (×G·1·G) to be higher than the signal (×1).

As illustrated in FIG. 2B, if Isat (×G) is greater than Ia, the use of the signal (×G·1/G) even in the range of the incident light quantity from Ia to Isat (×G) enables obtaining a signal with high S/N ratio. Since an object is relatively dark in the range of the incident light quantity up to Isat (×G), the effect of improvement in S/N ratio is prominent.

Figure 2C:
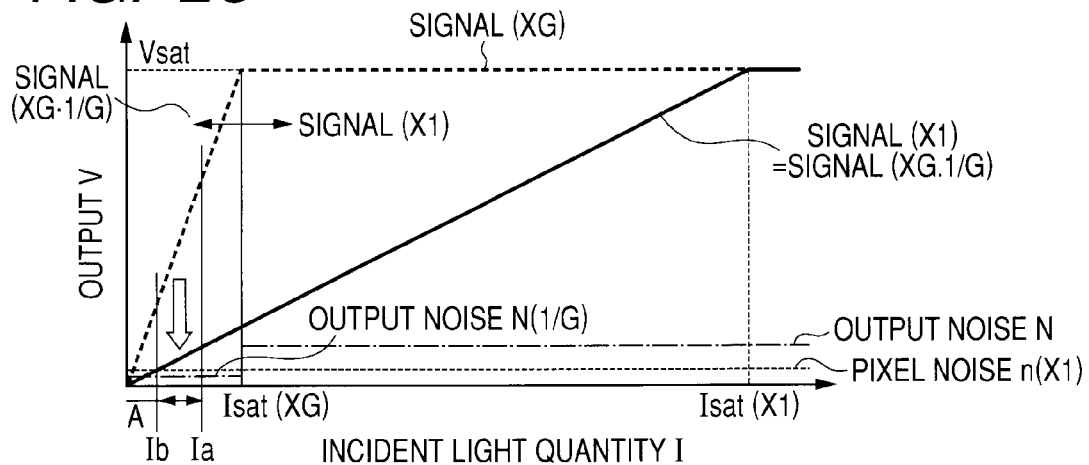

FIG. 2C is a roundup of the above description. The signal (×G·1/G) is used in the range of the incident light quantity from 0 to Isat and the signal (×1) is used in the range of the incident light quantity above Isat. Either of the two may be used when the incident light quantity is on Isat. The signal (×G·1/G) is higher in S/N ratio than the signal (×1), so that it is desirable to use the signal (×G·1/G). Focusing attention on the output noise and the pixel noise, the pixel noise n (×1) is dominant over the output noise N in the range of the incident light quantity from 0 to Isat and the output noise N is dominant over the pixel noise n (×1) in the range of the incident light quantity above Isat. The signal (×G·1/G) is smaller in level than the pixel noise n (×1) in the range in which the incident light quantity is smaller than that in the range indicated by A in FIG. 2C. Therefore, the signal output from the solid-state imaging device 1 is valid only in the range in which the incident light quantity is larger than Ib. As described above, the output noise and the pixel noise have temporal fluctuation and the maximum level thereof is illustrated in FIGS. 2A, 2B and 2C. Continuous capture of images like moving images averages noise components to make the noise components smaller than the pixel noise n as a whole. For this reason, a part of an image in the range where the signal (×G 1/G) is smaller than the pixel noise n (×1) can be recognized. In other words, suppressing the output noise N in the range of a small incident light quantity according to the present invention brings about the effect that even signals according to the incident light quantity lower than the pixel noise n (×1) in FIG. 2B can be recognized as an image.

The amplification of a signal output from a pixel by two kinds of gains is described above. According to the concept of the present invention, however, it is obvious that a signal output from a pixel may be amplified by three kinds or more of gains. Thereby enabling the enhancement of S/N ratio over a wide range of the incident light quantity.

Although the above example shows that the amplification ratio of the column amplifier 102 is set to 1 and G, it is to be understood that a combination of the amplification ratios is not limited. For example, the amplification ratios may be a combination of 2 and 16 or 0.5 and 4.

In the above description, the signal amplified by G is multiplied by 1/G, that is to say, the signal amplified by G is multiplied by an inverse number of gain of the column amplifier. This is performed to make the characteristics of two signals amplified by different gains to coincide with each other (so that the characteristics track the same straight line in FIGS. 2A, 2B and 2C). However, this does not mean that the signal needs to be multiplied by 1/G. If a signal is amplified by gains of 2 and 16, for example, with the column amplifier 102, the signal amplified by a gain of 16 is multiplied by ⅛ to allow the characteristic thereof to coincide with that of another signal. Alternatively, the signal amplified by a gain of 2 may be multiplied by ½ and the signal amplified by a gain of 16 may be multiplied by 1/16 to make the characteristics thereof to coincide with each other.

The objects to increase dynamic range and improve S/N ratio can be achieved without the coincidence between the aforementioned characteristics of two signals. Even if, out of the two signals amplified by gains of 1 and G, the signal amplified by a gain of G is multiplied not by 1/G, but 1/(2G), for example, the output noise N can be reduced to enable dynamic range to be enhanced and S/N ratio to be improved. However, in this case, the characteristic becomes discontinuous (causing offset) at Isat (×G) in FIG. 2C, so that it is desirable to perform offset correction.

To sum up the above description, signals output from a pixel amplified by gains p and q with the column amplifier are obtained. Where p<q and 1<q. An image signal output from the solid-state imaging device based on the signal amplified by a higher gain q is subjected to multiplication of less than 1. Thereby enhancing dynamic range and improving S/N ratio.

A factor of less than 1 is treated as p/q to enable the characteristic to coincide with that of the signal amplified by a gain p. If the signal amplified by a gain p is further multiplied by a factor of r, a factor of less than 1 is treated as (p/q)×r to enable the characteristics of two signals to coincide with each other. In other words, the factor of less than 1 may be a value having p/q as divisors.

For the sake of comparison, a technique disclosed in Japanese Patent Application Laid-Open No. H06-070222 is studied. In Japanese Patent Application Laid-Open No. H06-070222, a unit for amplifying a signal is provided outside the imaging device. This means that the output noise N in FIGS. 2A, 2B and 2C is also amplified, so neither S/N ratio is improved nor dynamic range is enhanced.

First Embodiment

Figure 3:
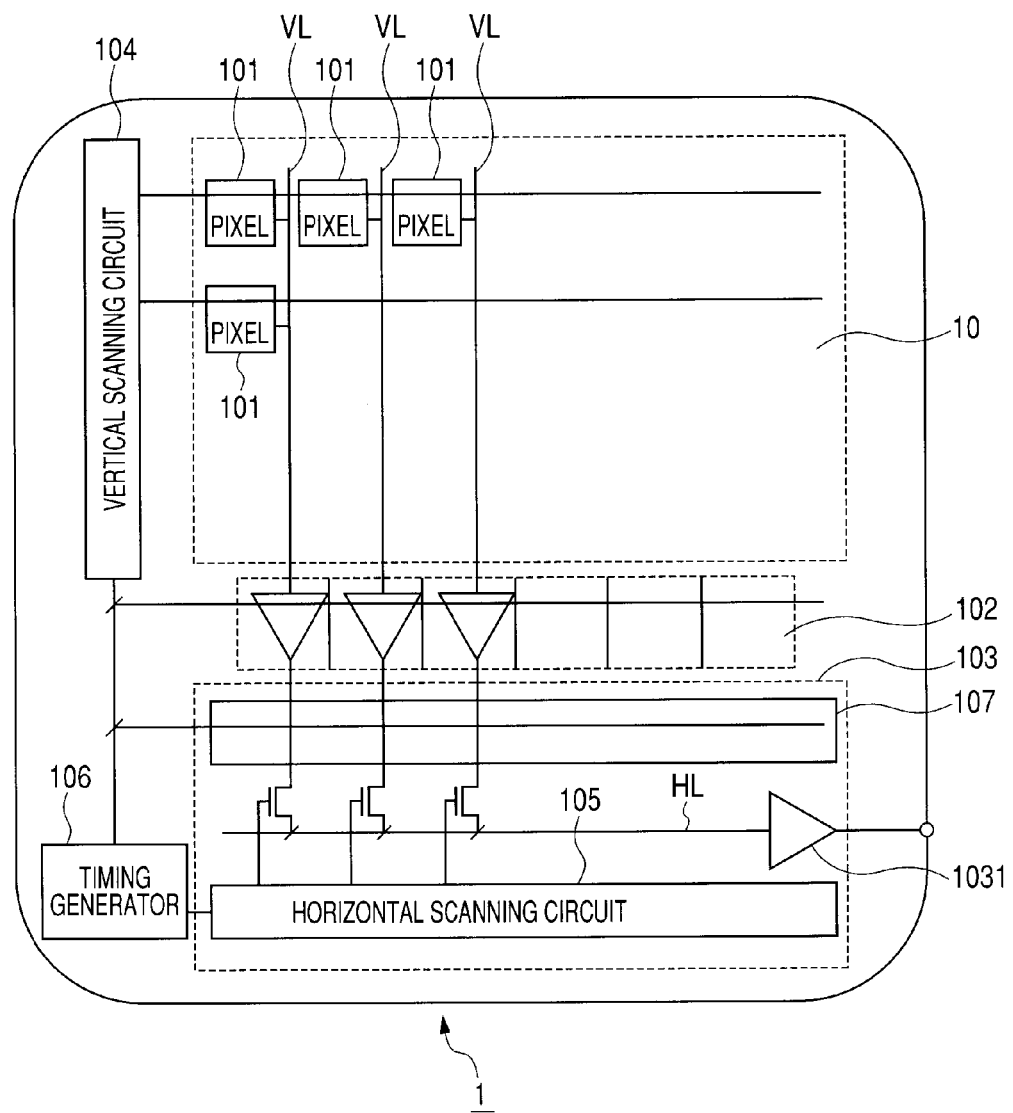
FIG. 3 is a schematic diagram illustrating a configuration of a solid-state imaging device according to a first embodiment.

FIG. 3 is a schematic diagram illustrating an example of configuration of a solid-state imaging device according to the first embodiment of the present invention. The same components as those in FIG. 1 are denoted by the same reference numerals. The solid-state imaging device 1 includes a signal storage unit 107 in an output portion 103.

Figure 4:
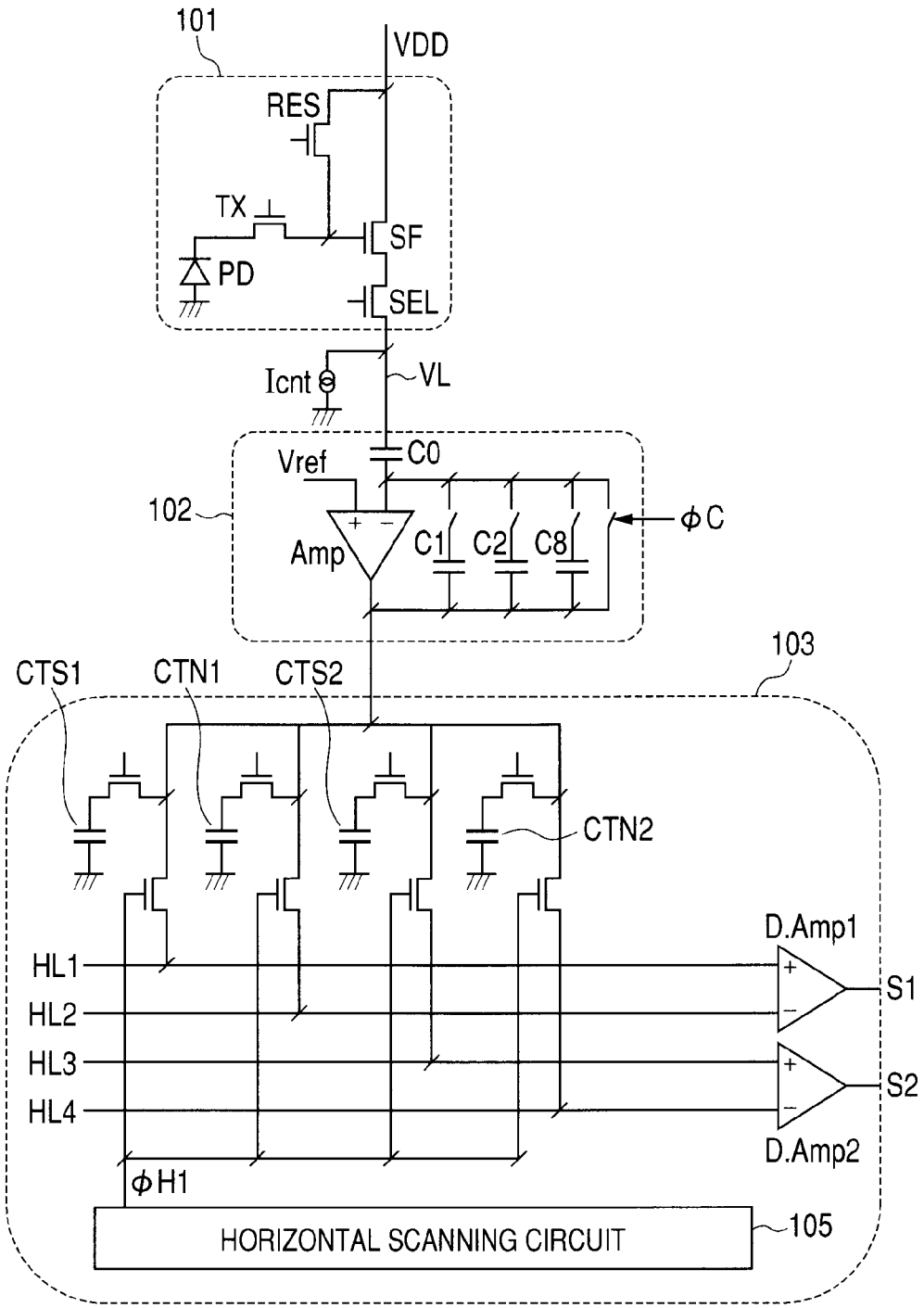
FIG. 4 is an equivalent circuit according to the first embodiment.

FIG. 4 is an equivalent circuit diagram illustrating more in detail the configuration including from a pixel 101 to an output amplifier 1031 in FIG. 3.

The pixel 101 includes a photodiode PD being a photoelectric conversion element and a transfer unit for transferring charges stored in the photodiode to the gate terminal of a MOS transistor forming a pixel output unit SF. The gate terminal being the input portion of the pixel output unit SF is connected to a power supply VDD through a reset portion RES. The source terminal of the pixel output unit SF is connected to one terminal of an input capacitor C0 of the column amplifier 102 via the pixel selecting unit SEL and to a constant current source Iconst.

The column amplifier 102 includes an operational amplifier Amp. The inverting input terminal of the operational amplifier Amp is connected to the other terminal of the input capacitor C0. Feedback capacitors C1, C2 and C3 are provided to connect the inverting input terminal of the operational amplifier Amp to the output terminal thereof through switches. Furthermore, there is provided a switch for short-circuiting the inverting input terminal of the operational amplifier Amp to the output terminal thereof. The non-inverting input terminal of the operational amplifier is provided with a power supply Vref. The signal output from the pixel 101 to vertical signal line VL is amplified by a gain determined by the ratio of the capacitance value of the feedback capacitors C1, C2 and C3 connected to the feedback path of the operational amplifier Amp to the capacitance value of the input capacitor C0. In this case, the capacitance values of the feedback capacitors C1, C2 and C3 are treated as the capacitance values of the input capacitor C0 multiplied by 1, ⅛ and 1/16 respectively. That is to say, in the present embodiment, each column amplifier is equipped with a column amplifying circuit with a variable gain. As described later, a noise attributed to a pixel is reduced by the input capacitor C0. Herein, the input capacitor C0, the operational amplifier Amp and the switch to which a signal φC is input are collectively treated as a first correlated double sampling (CDS) circuit.

The signal amplified by the column amplifier 102 is selectively transferred to storage capacitors CTS1, CTN1, CTS2 and CTN2 and stored therein. The storage capacitors CTS1 and CTS2 store signals based on charges obtained by photoelectric conversion with the photodiode PD. The storage capacitors CTN1 and CTN2 store signals based on the reset of the pixel output unit SF. The storage capacitors CTS1, CTN1, CTS2 and CTN2 are connected to horizontal signal lines HLn (n is 1 to 4) which are different from one another. The signals stored in the storage capacitors CTS1 and CTN1 are connected to different input terminals of a differential amplifier DAmp1 respectively through switches. The signals stored in the storage capacitors CTS2 and CTN2 are connected to different input terminals of a differential amplifier DAmp2 respectively through switches. When signals φH1, φH2, . . . are input from the horizontal scanning circuit 105, the signals stored in the storage capacitors CTS1, CTN1, CTS2 and CTN2 are input to corresponding differential amplifiers through the horizontal signal lines. The differential amplifier DAmp1 outputs a difference between the signals stored in the storage capacitors CTS1 and CTN1. The differential amplifier DAmp2 outputs a difference between the signals stored in the storage capacitors CTS2 and CTN2. The storage capacitors and the differential amplifiers are collectively treated as a second CDS circuit. The second CDS circuit reduces off-set attributable to the column amplifier.

Figure 5:
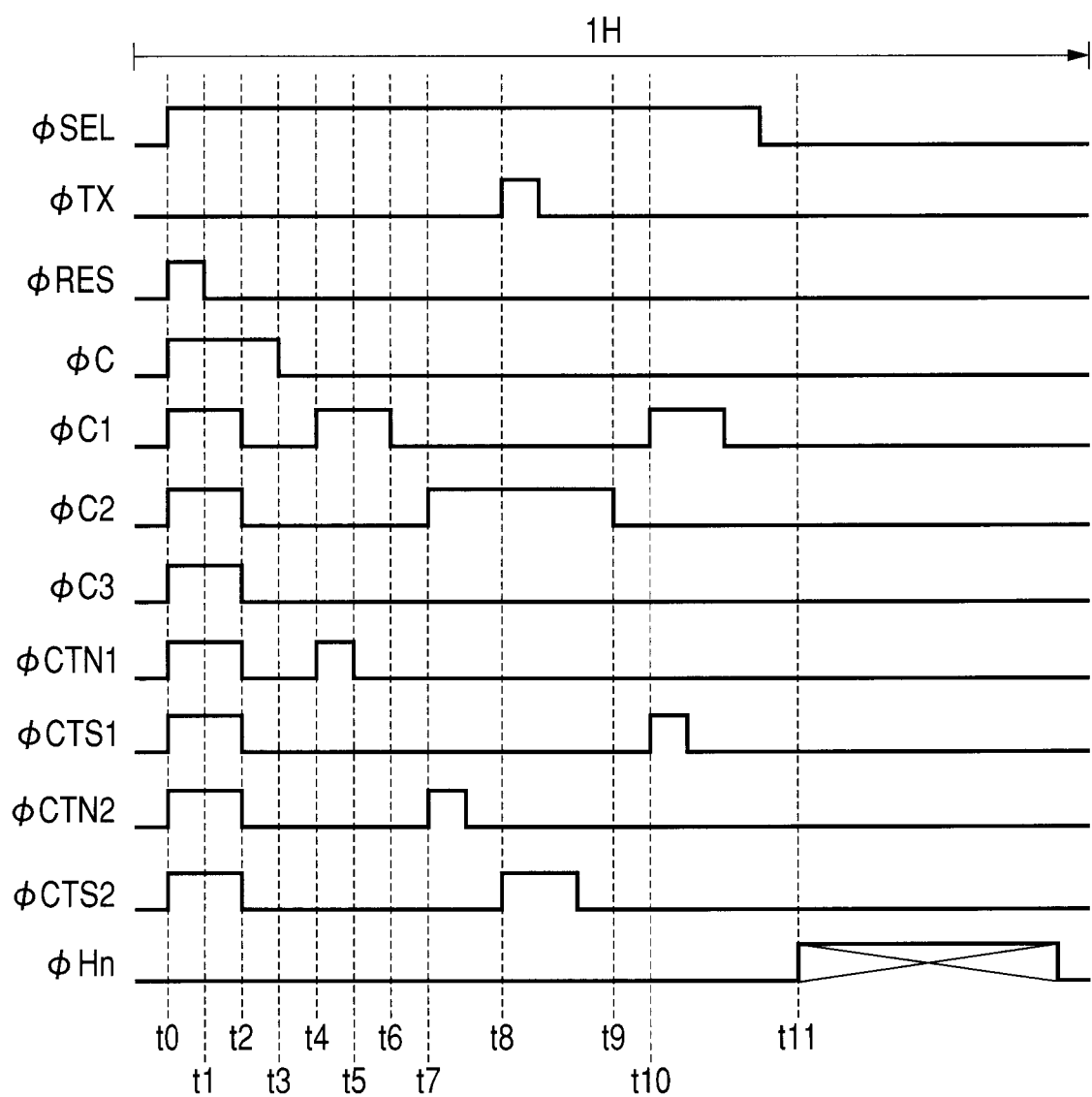
FIG. 5 is a timing chart for the solid-state imaging device according to the first embodiment.

The operation of the present embodiment is described below with reference to FIG. 5. The feedback capacitors C1 and C2 are used herein. The respective capacitance values are treated as equal to and ⅛ of the capacitance values of the input capacitors C0. There is described below a case where a signal is amplified by gains of 1 and 8. Signals input to the switches indicated by TX, RES and SEL in FIG. 4 are denoted by ɸTX, ɸRES and ɸSEL respectively. Each of the switches is turned on when the respective signal is at high level. Signals applied to the switches located between the feedback capacitors C1, C2 and C3 and the inverting input terminal of the operational amplifier Amp are denoted by ɸC1, ɸC2 and ɸC3 respectively. Each of the switch is turned the when a signal is at high level. Signals applied to the switches located between the storage capacitors CTS1, CTN1, CTS2 and CTN2 and the output terminal of the column amplifier 102 are denoted by ɸCTS1, ɸCTN1, ɸCTS2 and ɸCTN2 respectively. The switch is turned on when a signal is at high level.

The signals excluding the signal ɸTX and ɸHn change to a high level at time t0. The transition of the signal ɸSEL to a high level causes the pixel selecting unit SEL to turn to a conducting state, electrically connecting the source terminal of the pixel output unit to the constant current source Iconst to form a source follower circuit. Thereby allowing the level corresponding to the electric potential of the gate terminal of the pixel output unit SF to appear as a signal on the vertical signal line VL. The signal ɸRES is high level at this timing, so the level corresponding to the state where the gate terminal of the pixel output unit SF is reset appears on the vertical signal line VL. In addition, by the signals ɸC, ɸC1, ɸC2 and ɸC3 becoming high level, the inverting input terminal and the output terminal of the operational amplifier Amp are short circuited and the feedback capacitors C1, C2 and C3 are reset. The electric potential of both terminals of the feedback capacitors C1 and C2 can be regarded as the same potential as the power supply Vref because of the virtual ground of the operational amplifier Amp. Because the signals ɸCTN1, ɸCTS1, ɸCTN2 and ɸCTS2 are at high level, the storage capacitors CTN1, CTS1, CTN2 and CTS2 are reset by the output of the operational amplifier Amp.

The transition of the signal ɸRES to a low level at time t1 releases the state where the gate terminal of the pixel output unit SF is reset. The noise component generated along with the release of the reset state causes the pixel noise n.

The transition of the signals ɸC1, ɸC2, ɸC3, ɸCTN1, ɸCTS1, ɸCTN2 and ɸCTS2 to a low level at time t2 makes the switches corresponding thereto non-conductive.

After that, the transition of the signal ɸC to a low level at time t3 releases the short-circuit between the input and output terminals of the operational amplifier. The level corresponding to the reset of the gate terminal of the pixel output unit SF is clamped by the power supply Vref at the input capacitor C0.

By the transition of the signals ɸC1 and ɸCTN1 to a high level at time t4 and the transition of the signal ɸCTN1 to a low level at time t5, the output of the column amplifier 102 at this point is stored in the storage capacitor CTN1. The signal ɸC1 at this point is at high level, so only the feedback capacitor C1 is electrically connected to the feedback path of the operational amplifier Amp. In other words, the gain of the column amplifier 102 becomes C0/C1=C0/C0=1. The signal stored in the storage capacitor CTN1 includes an off-set component attributable to the column amplifier 102.

By the transition of the signal TC2 to a high level at time t7 after the transition of the signal TC1 to a low level at time t6, only the feedback capacitor C2 is electrically connected to the feedback path of the operational amplifier Amp. That is, the gain of the column amplifier 102 becomes C0/C2=C0/(C0/8)=8.

After the signal ɸCTN2 turns to a high level in a pulse shape at time t7 and when the signal ɸCTN2 turns to a low level, the signal including an off-set component attributable to the column amplifier 102 is stored in the storage capacitor CTN2.

When the signal ɸTX turns to a high level at time t8, the charges stored in the photodiode PD are transferred to the gate terminal of the pixel output unit SF. Accordingly, the electric potential at the gate terminal of the pixel output unit SF changes, and this causes a level appearing on the vertical signal line VL to change. Since the input capacitor C0 is at a floating state at this point, only the difference of electric potential with respect to the level clamped at time t1 on the vertical signal line VL is input to the inverting input terminal of the operational amplifier Amp. Out of the noise components generated before the clamp capacitor, noise components having correlation between the level on the vertical signal line VL at time t3 and the level on the vertical signal line VL at time t8 or later can be reduced by a clamp operation. Therefore, a signal based on the photo-electric conversion is input to the operational amplifier Amp. Since fluctuations in current flowing into the constant current source Iconst and a noise referred to as 1/f noise generated in the pixel output unit SF are different between time t1 and time t8 (have no correlation with each other), they cannot be reduced by the clamp operation. In the present embodiment, the noise component without correlation corresponds to the pixel noise n.

Only the feedback capacitor C2 having a capacitance value in which the capacitance value of the input capacitor C0 is multiplied by ⅛ exists in the feedback path of the operational amplifier Amp at time t8, which means that the signal based on the photo-electric conversion is amplified by a gain of 8. The signal ɸCTS2 is shifted to a high level in a pulse shape at time t8 and with the transition of the signal ɸCTS2 to a low level, the signal amplified with a gain of 8 by the column amplifier 102 is stored in the storage capacitor CTS2. The signal stored in the storage capacitor CTS2 includes an off-set component attributable to the column amplifier 102 as is the case with the storage capacitor CTN2.

After the signal ɸC2 turns to a low level at time t9, when the signal ɸC1 turns to a high level at time t10, only the feedback capacitor C1 is connected to the feedback path of the operational amplifier Amp. Since the capacitance value of the feedback capacitor C1 is equal to that of the input capacitor C0, the signal input to the column amplifier 102 is amplified by a gain of 1.

When the signal ɸCTS1 is turned to a high level at time t10 and then to a low level, the signal in which the level appearing on the vertical signal line VL is amplified by a gain of 1 is stored in the storage capacitor CTS1. The signal stored in the storage capacitor CTS1 includes an off-set component attributable to the column amplifier 102 as is the case with the storage capacitor CTN1.

After that the above operation, the selection state of the pixel 101 is released when the signal ɸSEL turns to a low level.

Signals are sequentially output from pixels of one row through the differential amplifiers DAmp1 and DAmp2 according to the sequential transition of the signal φHn to a high level from time t11. The signals stored in the storage capacitors include an off-set component attributable to the column amplifier 102, so the off-set component can be reduced by obtaining a difference by the differential amplifier. The differential amplifier DAmp1 outputs the signal S1 amplified by a gain of 1 and the differential amplifier DAmp2 outputs the signal S2 amplified by a gain of 8. The signals S1 and S2 include the foregoing output noise N. The signals S1 and S2 correspond to the output V in FIGS. 2A, 2B and 2C.

In the present embodiment, providing the column amplifier 102 on each column enables the pixels of one row to be processed in parallel. In other words, the column amplifier can be driven at a lower speed than the output amplifier 1031, producing the advantage that the column amplifier becomes less apt to be a noise source.

Figure 6:
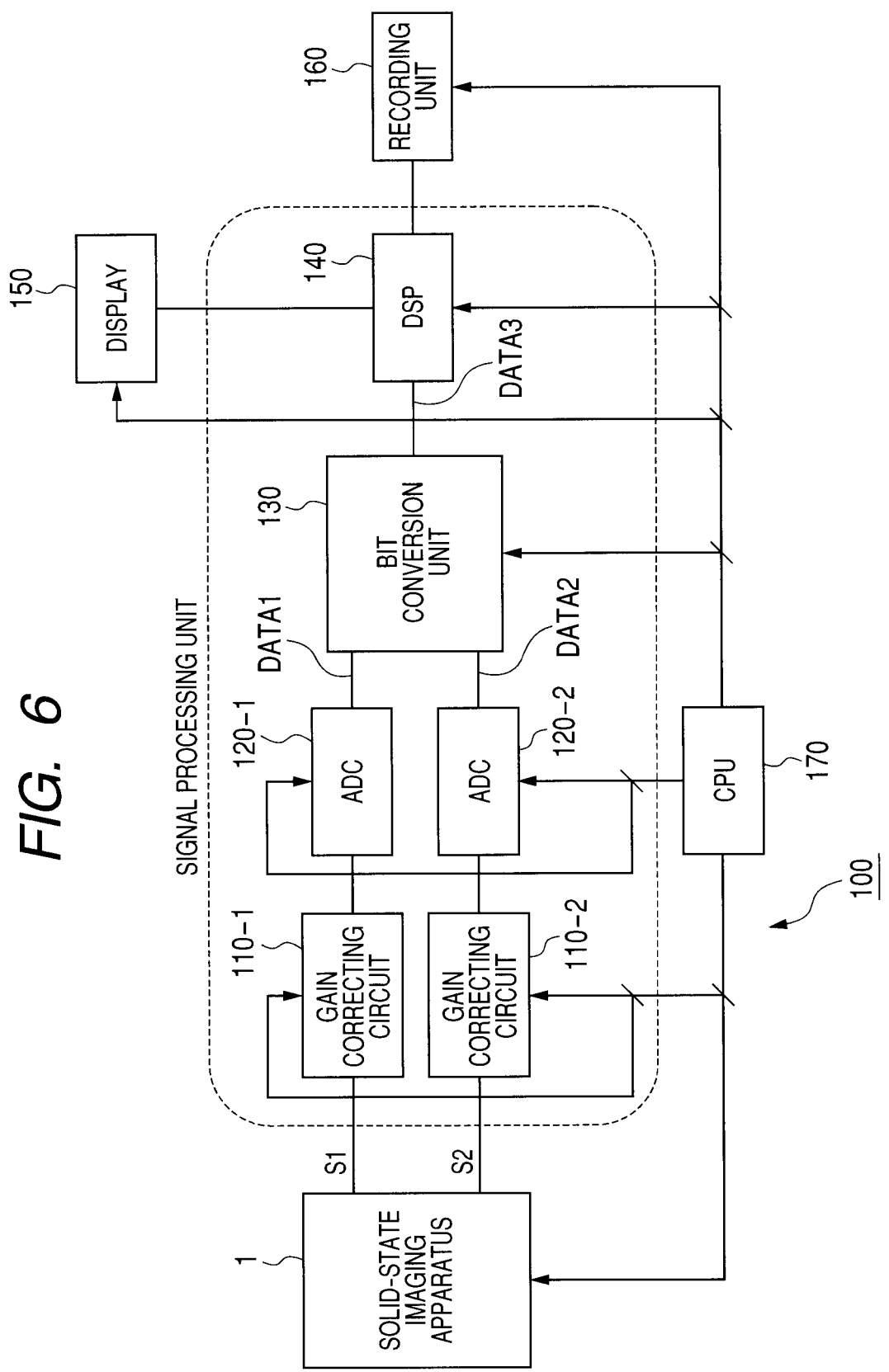
FIG. 6 is a schematic block diagram illustrating the imaging system according to the first embodiment.

Next, description is given on how the signal output from the solid-state imaging device is processed. FIG. 6 is a block diagram illustrating an example of configuration of an imaging system 100 using the solid-state imaging device 1.

The signals S1 and S2 output from the differential amplifier DAmp1 and DAmp2 of the solid-state imaging device 1 are input to gain correcting circuits 110 corresponding thereto. The gain correcting circuit 110 subjects the signal output from the solid-state imaging device 1 to a gain correction process. For example, capacitance values such as the input capacitor C0 and the feedback capacitors C1 and C2 which determine the gain of the column amplifier 102 sometimes deviate from design values due to dispersion of manufacturing conditions. The gain correcting circuit 110 corrects a gain error attributed to such dispersion. The gain error may be corrected based on a correction value previously stored in a memory. The gain correcting circuit 110 may be omitted if the gain error is negligible.

The signal processed by the gain correcting circuit 110 is converted to a digital signal by an analog-to-digital converter (ADC) 120.

The digital signal output from the ADC 120 is input to a bit conversion unit 130 for a process referred to as bit conversion. The bit conversion is later described in detail.

The signal output from the bit conversion unit 130 is subjected to γ (gamma) correction, for example, in a digital signal processor (DSP) 140, and then displayed on a display 150 and stored in a recording unit 160. In the present embodiment, a signal processing portion includes the gain correcting circuits 110, the ADC 120, the bit conversion unit 130 and the DSP 140.

The display 150 is a display unit such as an electronic view finder (EVF) provided on a digital camera, for example.

The recording unit 160 may be a detachable recording medium such as a semiconductor memory or a magneto-optical disk or a recording media stationarily attached to the system.

A CPU 170 is a circuit for controlling the entire imaging system 100 to set the operation timing of the timing generator 106 and the gain correcting circuits, for example, included in the solid-state imaging device 1.

Figure 7:
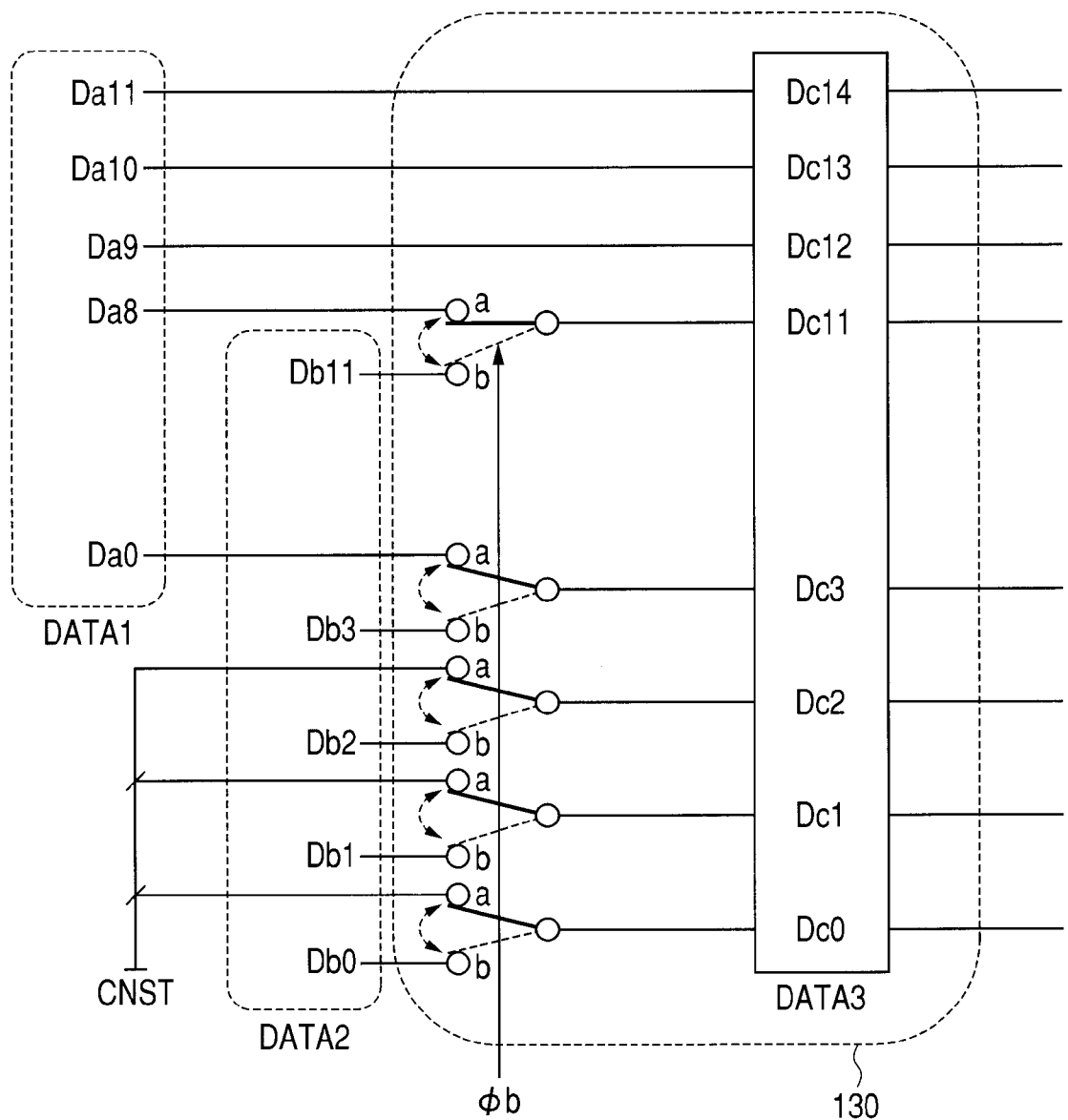
FIG. 7 is a schematic diagram illustrating an example of configuration of a bit conversion unit according to the first embodiment.

FIG. 7 is a schematic diagram illustrating an example of configuration of the bit conversion unit 130. Each of the ADC 120-1 and ADC 120-2 has a resolution of 12 bits. Data to be output therefrom are treated as DATA1 and DATA 2 respectively. In the following description, the gain G is treated as 8. In DATA1, DATA2 AND DATA3, Da11, Db11 and Dc14 thereof respectively are treated as most significant bits. In FIG. 7, Da0 to Da11 and Db0 to Db11 denote output terminals of each bit of the data DATA1 and DATA2. Dc0 to Dc14 denote input and output terminals of each bit in the bit conversion unit 130.

The bit conversion unit 130 is configured to selectively convert DATA1 and DATA2 being 12-bit data to 15-bit data and output them and has a function to multiply the signal amplified with a gain of 8 in the column amplifier 102 by the inverse number of the gain.

The operation of the bit conversion unit 130 is described more in detail. The data DATA1 based on the signal amplified by a gain of 1 follows the characteristic illustrated as the signal (×1) in FIG. 2C. The data DATA2 based on the signal amplified by a gain of G follows the characteristic illustrated as the signal (×G) in FIG. 2C. Suppose that the data DATA2 is saturated, that is, all bit strings of the data DATA2 are 1. In general, the signal level lower than the saturation level Vsat of output of the solid-state imaging device in FIGS. 2A, 2B and 2C is treated as the maximum value of the AD converter, i.e., the saturation level. This is because, the characteristic of output level to the incident light quantity is actually curved in the vicinity of the incident light quantity Isat, although the characteristic is treated as a straight line up to the saturation level for the sake of simplicity of description in FIGS. 2A, 2B and 2C.

If the data DATA2 is saturated, the signal φb is input to a switch group SW, connecting the data input terminals Dc3 to Dc11 out of the data input terminals Dc0 to Dc14 in the bit conversion unit 130 to lower bits Da0 to Da8 of the data DATA1. The data input terminals Dc0 to Dc2 are connected to the constant-bit input terminal CNST. The bit given by the constant-bit input terminal CNST may be 0 or 1. Thus, by connecting the switch group SW to a terminal "a", an operation equal to adding 3-bit redundant bits to the low bit side of the data DATA1 is performed. Since the added 3-lower bits is too small in level to be captured due to the output noise N, the added 3-lower bits influence an image very little, whether they are 0 or 1.

If the data DATA2 is not saturated, that is, 0 is included in the bit string of the data DATA2, the signal φb is input to the switch group SW, connecting the data input terminals Dc0 to Dc11 to Db0 to Db11 of the data DATA2. Da9 to Da11 of the data DATA1 are connected to the data input terminals Dc12 to Dc14. The data DATA2 based on the signal amplified by the gain being 8 times as high as that of the data DATA1 makes the range of light quantity in which the data DATA2 is not saturated the value of the data DATA1 equal to ⅛ of the data DATA2 in. In other words, bits at Da9 to Da11 will always be zero. For this reason, the output data DATA3 of the bit converter 130 in the case where the data DATA2 is not saturated is converted to 15 bits by adding 3 bits of the redundant bit of zero to the high-order bit of the 12-bit data DATA2. In other words, the output data DATA3 is made smaller in level by 3 bits (½ cubed=⅛) than the signal of the data DATA1, which is synonymous with the operation of ×1/G (where, ×⅛) indicated in FIG. 2C.

The above operation causes the bit converter 130 to always provide an appropriate signal. That is, data is output based on the signal amplified by a higher gain in the range in which the signal amplified with a higher gain is not saturated and data is output based on the signal amplified with a lower gain in the range in which the signal amplified by a higher gain is saturated. In FIG. 7, although there is illustrated an example of configuration of the bit converter adapted to the case where a gain difference between two data DATA1 and DATA2 is 8 times, the bit converter can be configured to adapt to the case where a gain difference is not 8 times. A plurality of gain differences can be set by the column amplifier 102. The configuration illustrated in FIG. 7 can be extended, so that a detailed configuration is omitted.

Discussion will be made on the length of the redundant bit added to the data DATA1 and DATA2. The data DATA1 is based on the signal obtained by amplifying the signal from the pixel with a gain p and the data DATA2 is based on the signal obtained by amplifying the signal from the pixel amplified with a gain q, where p<q and 1<q. The magnitude of the data DATA2 to an incident light quantity is q/p times as large as the data DATA1. Taking the bit number of redundant bit added to both data as q/p bits enables the characteristics of both data to coincide with each other (which means that the characteristics tracks the same straight line in FIGS. 2A, 2B and 2C).

The functional block corresponding to the bit conversion unit 130 need not be connected to other constituent elements in the same manner as illustrated in FIG. 6. For example, the signal S2 may be multiplied by ⅛ before the signal is AD converted by the ADC 120.

Figure 8:
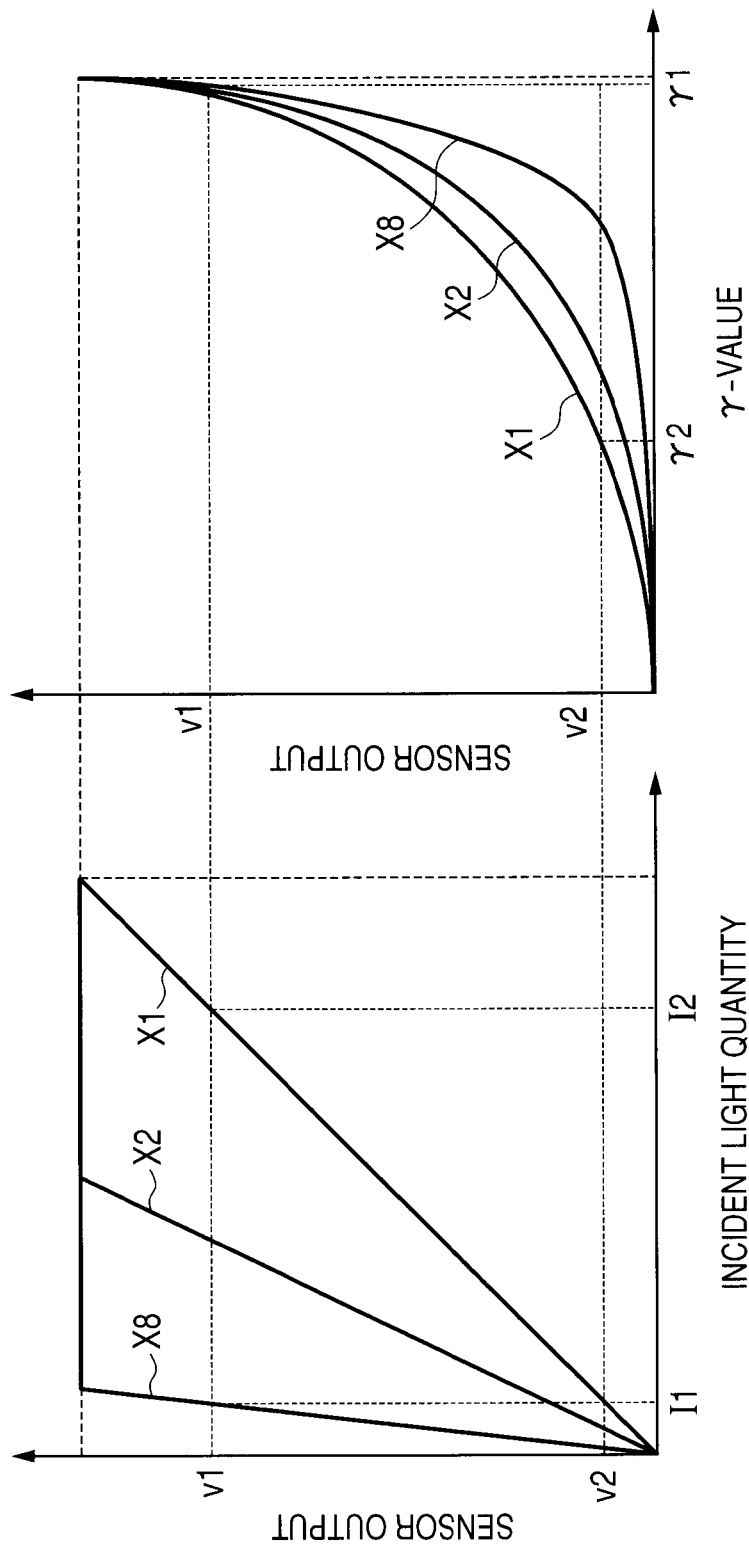
FIGS. 8A and 8B are charts representing the concept of a γ process according to the first embodiment.

There is described below the operation of gamma (γ) correction performed by the digital signal processor 140. FIG. 8A is a chart illustrating a relationship between the incident light quantity and the output of the solid-state imaging device 1 (sensor output). FIG. 8B is a chart illustrating a relationship between the sensor output and γ value.

As is the case with FIGS. 2A, 2B and 2C, FIG. 8A illustrates that the greater the gain of the column amplifier 102, the smaller the incident light quantity at which the saturation output is reached. FIG. 8B illustrates the γ value by which the sensor output in FIG. 8A taken as the input is multiplied. The ordinate indicates data input to the DSP through the gain correcting circuit 110, the ADC 120 and the bit converter 130. The abscissa indicates the γ value for the input data. For the sake of convenience, it is shown as sensor output.

There is discussed below a pixel on which light with the incident light quantity I1 is incident. Suppose that the incident light quantity I1 has a level at which the amplification with a gain of 8 by the column amplifier 102 does not saturate output. In accordance with the foregoing description, the incident light quantity I1 uses a signal multiplied with a high gain. FIG. 8A illustrates that the output of the solid-state imaging device becomes v1 (output A) when the signal based on the incident light quantity I1 is multiplied by a gain of 8. Furthermore, the sensor output becomes v1 (output B) when the gain with which the column amplifier 102 multiplies is 1 at the incident light quantity I2. That is, even when the incident light quantity is different, the sensor output is sometimes at the same level depending on a value of a gain by which the column amplifier 102 multiplies.

If the sensor outputs are at the same level, a γ value by which the sensor outputs is multiplied is generally the same. In other words, the sensor output v1 obtained when the incident light quantity is I1 and the column amplifier 102 has a gain of 8 and the sensor output v1 obtained when the incident light quantity is I2 and the column amplifier 102 has a gain of 1 are multiplied by the same γ value (here, γ1). Although the sensor outputs are at the same level, the original incident light quantity is different between the outputs A and B, so that multiplying both sensor outputs by the same γ value makes the brightness of an obtained image to be unnatural. This is because both sensor outputs are multiplied by the same γ value without considering that the incident light quantity I1 corresponding to the sensor output v1 obtained when a gain is 8 in the column amplifier 102 is smaller (darker) than the incident light quantity I2 corresponding to the sensor output v1 obtained when a gain is 1 in the column amplifier 102.

In the present embodiment, the γ value is determined in the following manner. The signal obtained when the gain of the column amplifier 102 is 1 is treated as S1 and the signal obtained when the gain of the column amplifier 102 is 8 is treated as S2. The sensor output obtained when the incident light quantity is I1 and a gain is 1 in the column amplifier 102 is treated as v2. The output A is multiplied by the γ value corresponding to the sensor output v2, enabling obtaining a naturally bright image.

In the above description, both signals S1 and S2 are multiplied by the γ value with the characteristic indicated by "×1" in FIG. 8B. The use of the γ value with the characteristic according to the gain of the column amplifier 102 allows obtaining an image with more suitable brightness. The γ value may be determined by comparing the value of the DATA 3 input to the DSP 140 with a lookup table previously prepared, for example.

In the present embodiment, although the γ processing is performed after an image signal is multiplied by a factor less than 1, the γ processing may be performed before the image signal is multiplied by a factor less than 1.

As described above, according to the first embodiment of the present invention, the dynamic range of the solid-state imaging device can be increased and the S/N ratio of the imaging system can be improved. Furthermore, performing a process for multiplying by the γ value according to the gain of the column amplifier 102 in the DSP 140 allows obtaining a suitable image.

In the present embodiment, although there is described an example in which a gain is determined using any one of a plurality of feedback capacitors provided for each column amplifier 102, two or more feedback capacitors may be electrically connected to the feedback path of the operational amplifier Amp together. The change of the combination enables diversely switch the gain of the column amplifier 102.

Second Embodiment

The second embodiment of the present invention is described below with reference to FIG. 9. The present embodiment is different from the first embodiment in that a plurality of column amplifiers is provided for each column of a pixel.

Figure 9:
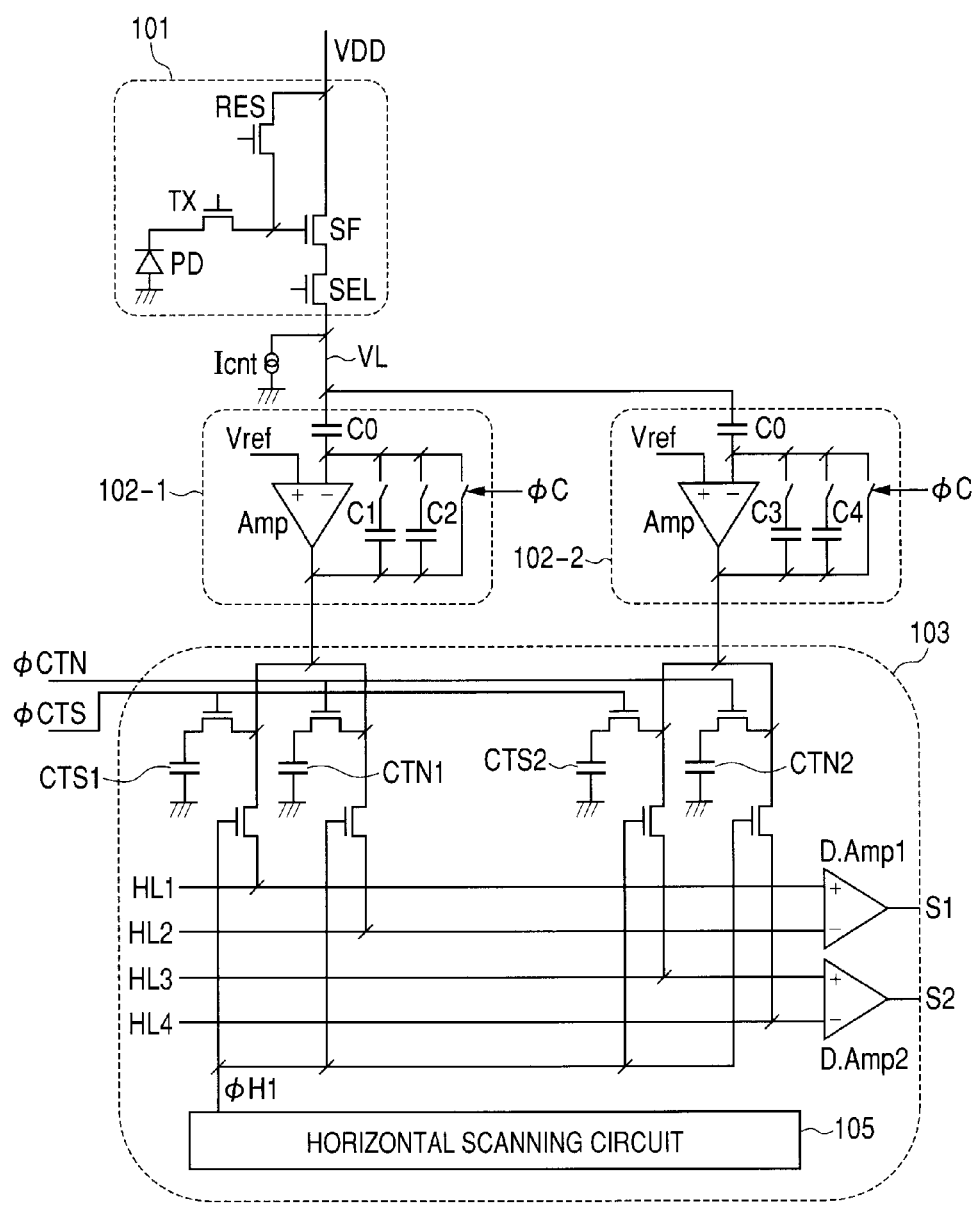
FIG. 9 is a schematic diagram illustrating a configuration of a solid-state imaging device according to a second embodiment.

FIG. 9 is a schematic diagram illustrating one pixel extracted from a column of pixels. The two column amplifiers 102-1 and 102-2 are provided on the vertical signal line VL. Herein, the input capacitors C0 of the column amplifiers 102-1 and 102-2 are the same in capacitance value. The column amplifiers 102-1 and 102-2 are different in that the capacitances of the feedback capacitors provided on the feedback paths between the inverting input terminal and the output terminal of the operational amplifier Amp are different from each other. The feedback capacitors C1 and C2 are connected to the column amplifier 102-1 and the feedback capacitors C3 and C4 are connected to the column amplifier 102-2. The capacitance values of the feedback capacitors C1, C2, C3 and C4 are treated as the capacitance values of the input capacitor C0 multiplied by 1, ½, ⅛ and 1/16 respectively. That is to say, in the present embodiment, each column amplifier is equipped with a column amplifier capable of setting gains different from each other. If the column amplifier 102 can set gains different from each other, the column amplifier may be set the same gains. The storage capacitors CTS1 and CTS2 are controlled by the signal φCTS and the storage capacitors CTN1 and CTN2 are controlled by the signal φCTN.

Figure 10:
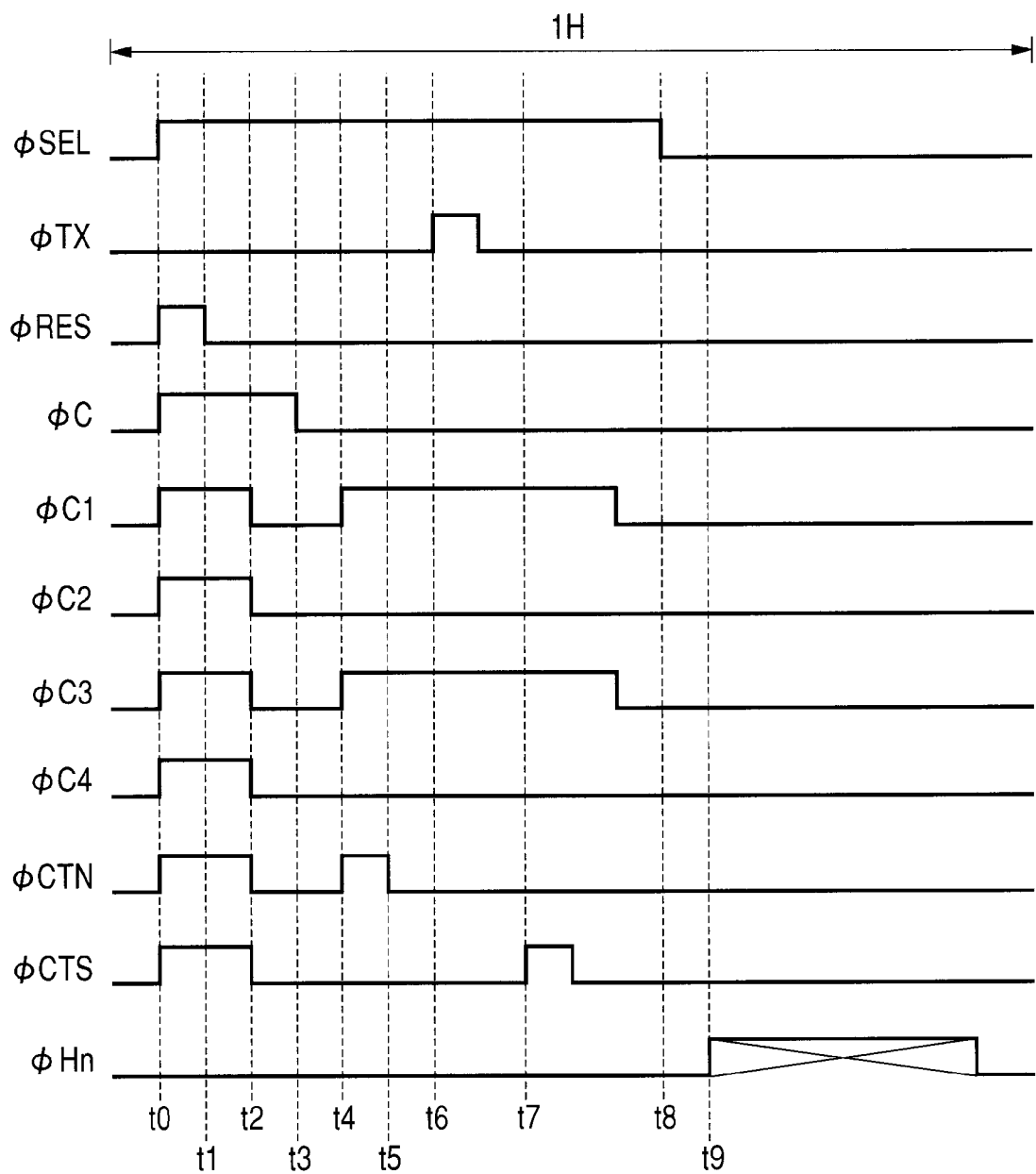
FIG. 10 is a timing chart of the solid-state imaging device according to the second embodiment.

The operation of the present invention is described below with reference to FIG. 10. FIG. 10 is a timing chart for obtaining signal from the solid-state imaging device in relation to a pixel on a row out of pixels arranged in a matrix. The signals input to the same components as those in FIG. 5 are denoted by the same reference numerals as those in FIG. 5. The gain of the column amplifier 102-1 is 1 and that of the column amplifier 102-2 is 8.

The signals excluding the signal φTX and φHn are shifted to a high level at time t0. The transition of the signal φSEL to a high level causes the pixel selecting unit SEL to conduct, electrically connecting the source terminal of the pixel output unit to the constant current source Iconst to form a source follower circuit. Thereby, the level corresponding to the electric potential of the gate terminal of the pixel output unit SF appears as a signal on the vertical signal line VL. The signal φRES being at high level at this timing causes the level corresponding to the state where the gate terminal of the pixel output unit SF is reset to appear on the vertical signal line VL. In addition, the signals φC, φC1, φC2, φC3 and φC4 being at high level short-circuit between the inverting input terminal and the output terminal of the operational amplifier Amp and reset the feedback capacitors C1, C2, C3 and C4. The electric potential across both terminals of the feedback capacitors C1 and C3 can be regarded as the same potential as the power supply Vref because of the virtual ground of the operational amplifier Amp. The signals φCTN and φCTS being at high level causes the output of the operational amplifier Amp to reset the storage capacitors CTN1, CTS1, CTN2 and CTS2.

The transition of the signal φRES to a low level releases the state where the gate terminal of the pixel output unit SF is reset. The noise component generated along with the release of the reset state causes the pixel noise n.

The transition of the signals φC1, φC2, φC3, φC4, φCTN, and φCTS to a low level at time t2 makes the switches corresponding thereto non-conductive.

The transition of the signal φC to a low level at time t3 releases the short-circuit between the input and output terminals of the operational amplifiers. Thereby, the level corresponding to the reset of the gate terminal of the pixel output unit SF is clamped by the power supply Vref at the input capacitor C0.

The transition of the signals TC1 and φCTN to a high level at time t4 and the transition of the signal φCTN to a low level at time t5 store at this point the output of the column amplifier 102-1 in the storage capacitor CTN1 and the output of the column amplifier 102-2 in the storage capacitor CTN2. The signal stored in the storage capacitors CTN1 and CTN2 includes an off-set component attributable to the column amplifier 102.

The transition of the signal φTX to a high level at time t6 transfers the charges stored in the photodiode PD to the gate terminal of the pixel output unit SF. Thereby, the electric potential at the gate terminal of the pixel output unit SF changes to change a level appearing on the vertical signal line VL. Since the input capacitor C0 strays at this point, only a fluctuation portion with respect to the level clamped at time t1 on the vertical signal line VL is input to the inverting input terminal of the operational amplifier. In other words, noise components generated before the clamp capacitor can be reduced by a clamp operation and the signal based on photoelectric conversion is input to the operational amplifier Amp. In the present embodiment, the noise component without correlation as previously described remains as the pixel noise n.

The signal φCTS is shifted to a high level in pulse shape at time t7. The transition of the signal φCTS to a low level stores the signal output from the column amplifier 102-1 in the storage capacitor CTS1 and the signal output from the column amplifier 102-2 in the storage capacitor CTS2. The signals stored in the storage capacitors CTS1 and CTS2 include an off-set component attributable to the corresponding column amplifier 102 as is the case with the storage capacitors CTN1 and CTN2.

After that, the transition of the signals φC1 and φC3 to a low level and then the transition of the signal φSEL to a low level at time t8 release the selection state of the pixel 101.

The sequential transition of the signal φHn to a high level at time t9 outputs signals from pixels of one row through the differential amplifiers DAmp1 and DAmp2. The signals stored in the storage capacitors include an off-set component attributable to the column amplifier 102, so that the differential amplifier obtaining a difference allows the off-set component to be reduced. The differential amplifier DAmp1 outputs the signal S1 amplified by a gain of 1 and the differential amplifier DAmp2 outputs the signal S2 amplified by a gain of 8. The signals S1 and S2 include the foregoing output noise N.

In the present embodiment, the column amplifier 102 is provided in each column to enable the pixels of one-row portion to be processed in parallel. In other words, the column amplifier can be driven at a lower speed than the output amplifier 1031, producing the advantage that the column amplifier becomes less apt to be a noise source.

The signal output from the solid-state imaging device 1 may be processed in the same manner as in the first embodiment.

According to the present embodiment, the dynamic range of the solid-state imaging device can be enhanced and the S/N ratio of the imaging system can be improved. Furthermore, performing a process for multiplying by the γ value according to the gain of the column amplifier 102 in the DSP 140 allows obtaining a suitable image. Particularly to the present embodiment, providing a plurality of the column amplifiers whose gains are different on the vertical signal line VL brings the advantage that the pixels can be processed in parallel, which is suited for a high speed operation.

Third Embodiment

Another embodiment to which the present invention can be applied is described with reference to FIG. 11.

Figure 11:
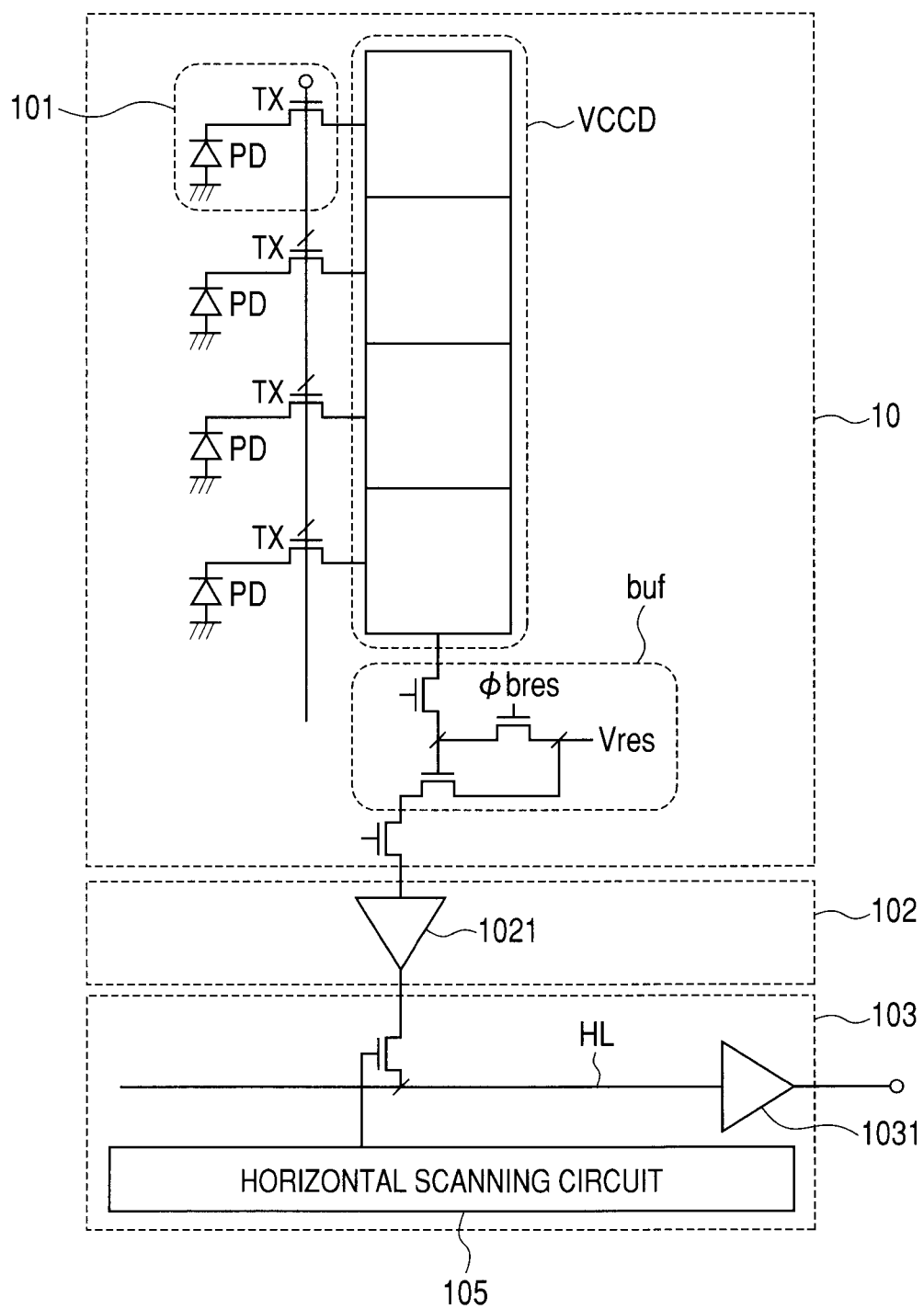
FIG. 11 is a schematic diagram illustrating a configuration of a solid-state imaging device according to a third embodiment.

FIG. 11 is a schematic diagram illustrating a part of one column extracted from a pixel portion according to the present embodiment. Although four pixels are illustrated as one-column portion of the pixel portion, the present embodiment is not limited to this number. In the present embodiment, pixels including the photodiodes PD and the transfer portions TX are arranged in a matrix. By turning on the transfer portion TX in response to the signal φTX, charges stored in the photodiode PD are transferred to a vertical CCD circuit VCCD and the charges are sequentially transferred to a buffer unit buf in response to a vertical transfer pulse (not shown). The buffer unit buf is a charge-to-voltage converting portion for converting into a voltage a charge transferred from the vertical CCD circuit VCCD. The output of the buffer unit buf is input to the column amplifier 102. The column amplifier 102 and the output portion 103 may have the same configuration as those described above.

The transition of a signal φbres to a high level in the buffer unit buf resets the input portion of the buffer unit buf. Resetting is required before the charge of the following pixel is transferred from the vertical CCD circuit VCCD. In the present embodiment, a noise corresponding to the pixel noise n is generated in the buffer unit buf.

Also in the present embodiment, the use of two storage capacitors CTS and CTN and the differential amplifier DAmp allows reducing an off-set component attributable to the buffer unit buf and an off-set component attributable to the column amplifier 102.

In the present embodiment, the column amplifier 102 is provided in each column to enable the pixels of one-row portion to be processed in parallel. In other words, the column amplifier can be driven at a lower speed than the output amplifier 1031, producing the advantage that the column amplifier becomes less apt to be a noise source.

The signal output from the solid-state imaging device 1 may be processed in the same manner as in the first embodiment.

According to the present embodiment, the dynamic range of the solid-state imaging device can be enhanced and the S/N ratio of the imaging system can be improved. Furthermore, performing a process for multiplying by the γ value according to the gain of the column amplifier 102 in the DSP 140 allows obtaining a suitable image. Particularly to the present embodiment, transferring charges generated in the photodiode PD to the vertical CCD circuit VCCD brings the advantage that noise components are smaller, eliminating the need for clamp operation performed in the first and second embodiments.

(Others)

Figure 12:
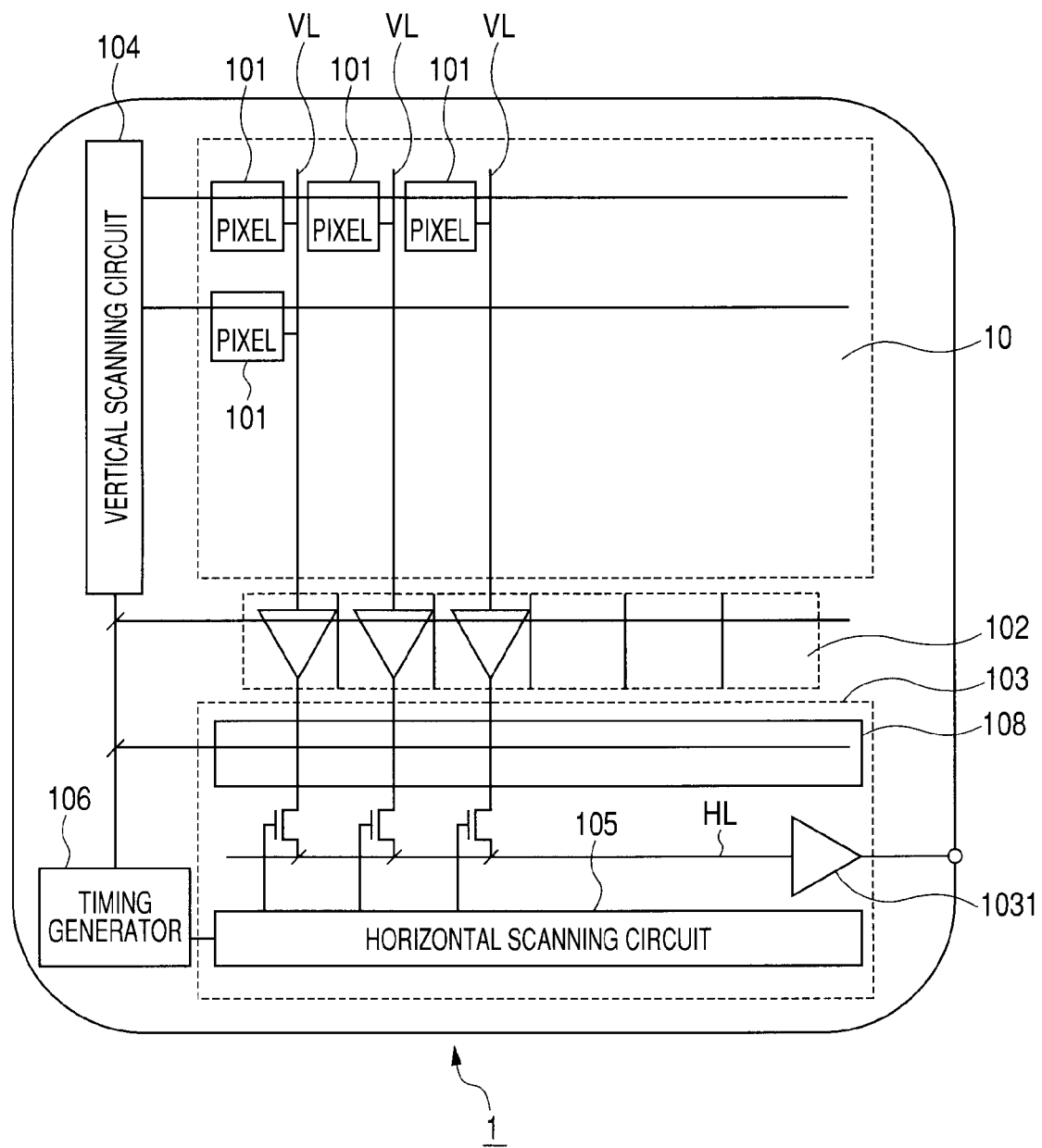
FIG. 12 is a schematic diagram illustrating a configuration of a solid-state imaging device according to an embodiment of the present invention.

The present invention can be implemented in various configurations. One example of the configurations is illustrated in FIG. 12. The same components as those used in the solid-state imaging device illustrated in FIG. 3 are denoted by the same reference numerals.

The solid-state imaging device illustrated in FIG. 12 has a column AD portion 108 at the rear stage of the column amplifier 102. Providing an AD converter for each column of pixels, i.e., for each column amplifier enables the A/D conversion of the signals of one-row portion in parallel, producing the advantage suited for a high speed operation. Although only a single horizontal signal line HL is illustrated in FIG. 12, in an actual configuration, the horizontal signal lines HL of the number of which corresponds to the resolution (bit number) of the column AD portion are provided. The column AD portion 108 may be shared in part with the column amplifier 102.

In the configuration in which two column amplifiers are provided for each column of pixels, the AD converter is provided for each column amplifier to enable a further higher speed operation.

Figure 13:
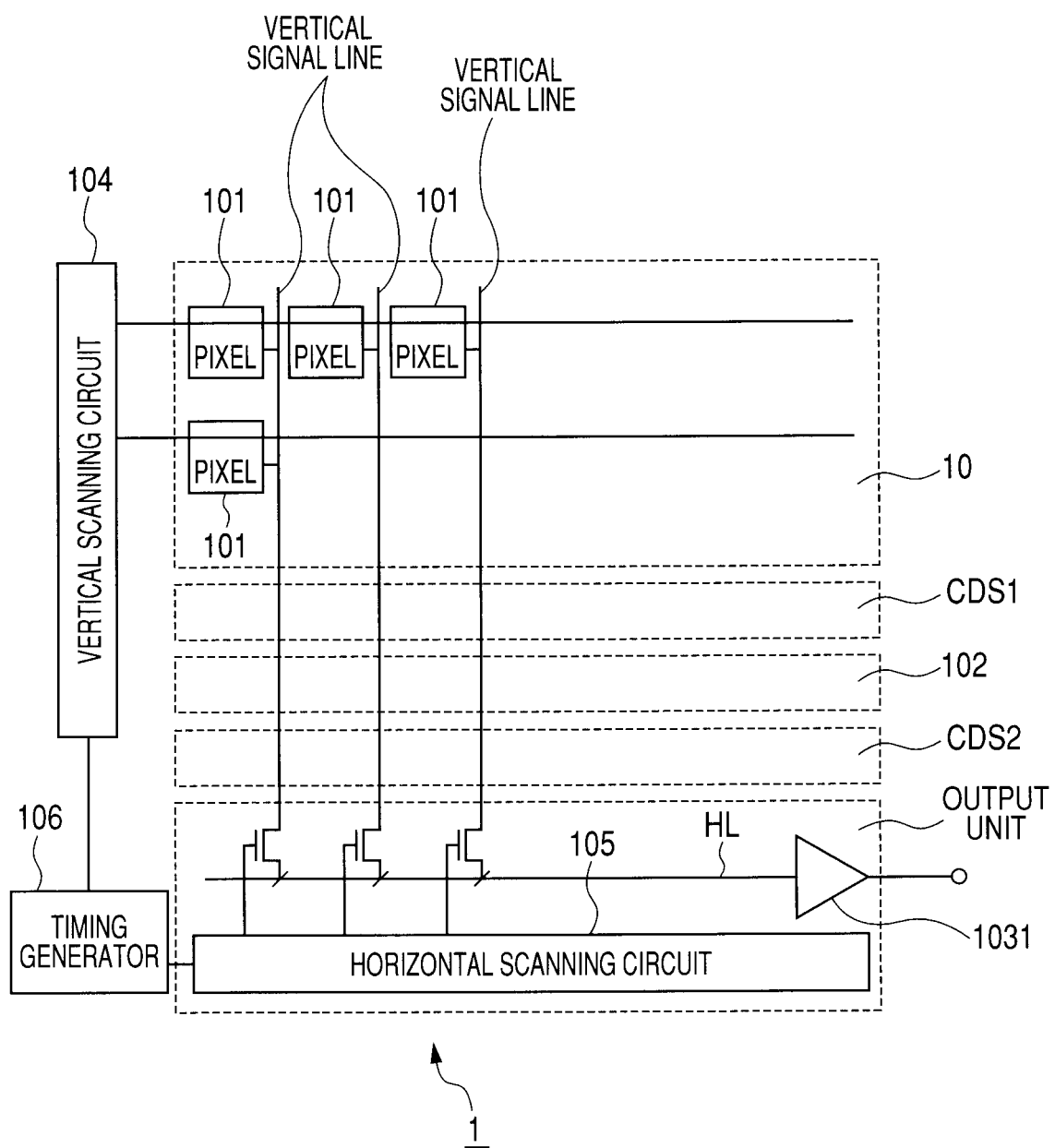
FIG. 13 is a schematic diagram illustrating a configuration of a solid-state imaging device according to an embodiment of the present invention.

FIG. 13 is a block diagram of the configuration illustrated in FIG. 4. The solid-state imaging device includes a pixel portion 10 in which pixels 101 are arranged in a matrix and a CDS circuit CDS1 for reducing a noise attributable to the pixel portion 10. The solid-state imaging device further includes a column amplifier for amplifying a signal output from a first CDS circuit CDS1 and a second CDS circuit CDS2 for reducing an off-set component attributable to the column amplifier. The solid-state imaging device further includes an output portion 103 for outputting a signal output from the second CDS circuit CDS2. The noise attributable to the pixel portion 10 is reduced by the first CDS circuit CDS1 to enable effective use of dynamic range of the input side of the column amplifier 102. Since an off-set component attributed to the dispersion of manufacturing conditions exists in an amplifier used in the column amplifier 102, providing the second CDS circuit CDS2 is effective to improve picture quality. Also in this configuration, it is needless to say that the column AD portion may be provided as illustrated in FIG. 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2008-171747, filed Jun. 30, 2008, which is hereby incorporated by reference herein in its entirety.

What is claimed is:

1. An imaging system comprising:
a solid-state imaging device having
a plurality of pixels arranged in a matrix, each for outputting an image signal based on a noise component and an image signal based on the noise component and a photoelectric conversion, in that order,
column amplifiers each provided corresponding to each of columns of the pixels;
an output portion for outputting the image signals based on an amplification by the column amplifier; and
a signal processing unit receiving the image signals, wherein
the column amplifier amplifies the image signals outputted from the pixel, wherein a gain of the column amplifier is changed from a first gain to a second gain while the image signal based on the noise component is applied to the column amplifier, the image signal based on the noise component and the photoelectric conversion is applied to the column amplifier while the column amplifier maintains the second gain, the gain of the column amplifier is changed from the second gain to the first gain while the image signal based on the noise component and the photoelectric conversion is applied to the column amplifier, and the first or second gain is q which is greater than 1, and
the signal processing unit amplifies, by a factor smaller than 1, the image signal based on the signal amplified by the column amplifier.

2. The imaging system according to claim 1, wherein the signal processing unit has an analog-to-digital converter for converting the image signal into a digital signal, and amplifies, by the factor smaller than 1, the digital signal converted by the analog-to-digital converter.

3. The imaging system according to claim 2, wherein the column amplifier amplifies the signal output from the pixel by a gain p smaller than the gain q, and the signal processing unit has a bit convertor for converting a bit number of the digital signal by adding a redundant bit to the digital signal converted by the analog-to-digital converter from the image signal based on the amplification by the gain p, and to the digital signal converted by the analog-to-digital converter from the image signal based on the amplification by the gain q.

4. The imaging system according to claim 3, wherein the bit convertor adds the redundant bit to lower digits of the digital signal converted by the analog-to-digital converter from the image signal based on the amplification by the gain p, and to higher digits of the digital signal converted by the analog-to-digital converter from the image signal based on the amplification by the gain q.

5. The imaging system according to claim 3, wherein the redundant bit is in q/p bits.

6. The imaging system according to claim 3, wherein the signal processing unit applies different gamma-values to the image signal based on amplification by the gain p and the image signal based on amplification by the gain q.

7. The imaging system according to claim 3, wherein the factor smaller than 1 is p/q.

8. The imaging system according to claim 3, wherein the factor p is 1.

9. The imaging system according to claim 1, wherein the solid-state imaging device has an analog-to-digital converter for converting the image signal into a digital signal, and signal processing unit multiplies, by the factor smaller than 1, the digital signal converted by the analog-to-digital converter.

10. The imaging system according to claim 8, further comprising more than one of the analog-to-digital converters, wherein each of the analog-to-digital converters is arranged correspondingly to each of the columns of the pixels.

11. The imaging system according to claim 1,
wherein each of the plurality of pixels includes:
a photoelectric conversion element;
a pixel output unit outputting a signal based on a voltage of an input portion of the pixel output unit;
a transfer unit transferring a charge accumulated in the photoelectric conversion element to the input portion of the pixel output unit; and
a reset unit resetting the input portion of the pixel output unit.

12. The imaging system according to claim 1, wherein the solid-state imaging device has a first CDS circuit for reducing a noise attributable to the pixel, and the signal of which noise is reduced by the first CDS circuit is input to the column amplifier.

13. The imaging system according to claim 1, wherein the output unit has a second CDS circuit for reducing an offset attributable to the column amplifier.

14. The imaging system according to claim 1, wherein the second gain is q.

15. A driving method of an imaging system comprising a solid-state imaging device having a plurality of pixels, arranged in an array, each for outputting an image signal based on a noise component and an image signal based on the noise component and a photoelectric conversion, in that order, column amplifiers each corresponding to each of columns of the pixels and an output portion for outputting the image signals based on an amplification by the column amplifier; and
a signal processing unit receiving the image signals, wherein
the method comprising steps of:
amplifying, by the column amplifier, the image signals outputted from the pixel, wherein a gain of the column amplifier is changed from a first gain to a second gain while the image signal based on the noise component is applied to the column amplifier, the image signal based on the noise component and the photoelectric conversion is applied to the column amplifier while the column amplifier maintains the second gain, the gain of the column amplifier is changed from the second gain to the first gain while the image signal based on the noise component and the photoelectric conversion is applied to the column amplifier, and the first or second gain is q which is greater than 1, and
amplifying, by the signal processing unit, by a factor smaller than 1, the image signal based on the signal amplified by the column amplifier.

16. The driving method according to claim 15, wherein the column amplifier amplifies the signal output from the pixel by a gain p smaller than the gain q, and the factor smaller than 1 is p/q.

17. The driving method according to claim 15, wherein the signal processing unit has an analog-to-digital converter for converting the image signal into a digital signal, and amplifies, by the factor smaller than 1, the digital signal converted by the analog-to-digital converter.

18. The driving method according to claim 17, further comprising: a step of converting a bit number of the digital signal by adding a redundant bit to the digital signal converted by the analog-to-digital converter from the image signal based on the amplification by the gain p, and to the digital signal converted by the analog-to-digital converter from the image signal based on the amplification by the gain q.

19. The driving method according to claim 18, further comprising: a step of adding the redundant bit to lower digits of the digital signal converted by the analog-to-digital converter from the image signal based on the amplification by the gain p, and a step of adding the redundant bit to higher digits of the digital signal converted by the analog-to-digital converter from the image signal based on the amplification by the gain q.

20. The driving method according to claim 18, wherein the redundant bit is in q/p bits.

21. The driving method according to claim 15, further comprising: a step of applying different gamma-values to the image signal based on amplification by the gain p and the image signal based on amplification by the gain q.

* * * * *